United States Patent Office 3,542,943
Patented Nov. 24, 1970

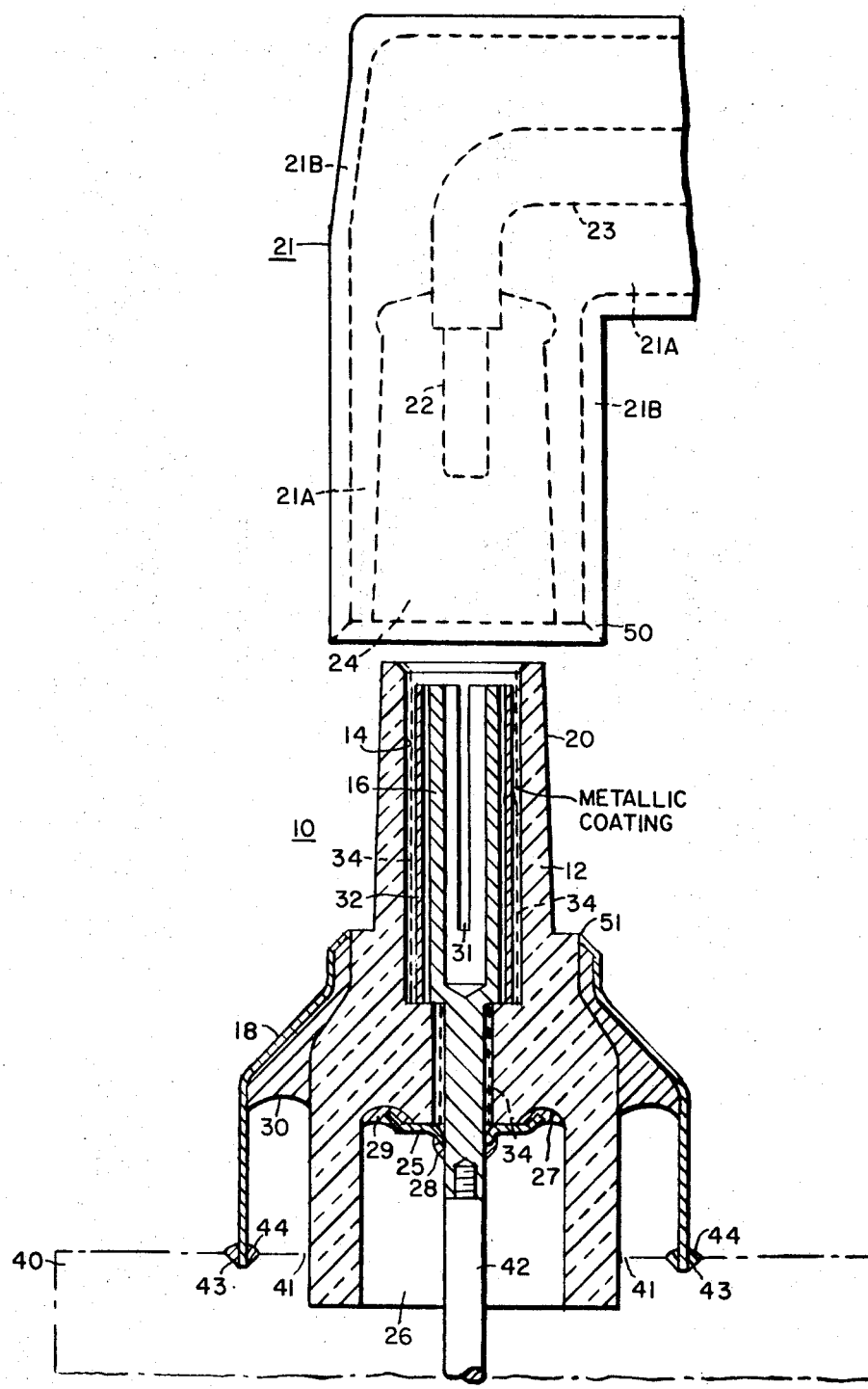

3,542,943
WATER TIGHT CONNECTOR BUSHING FOR CAPACITOR UNITS
Robert D. Aungst, Bloomington, Ind., assignor to Westinghouse Electric Corporation, Pittsburgh, Pa., a corporation of Pennsylvania
Filed Feb. 7, 1969, Ser. No. 797,644
Int. Cl. H01b 17/26
U.S. Cl. 174—142
6 Claims

ABSTRACT OF THE DISCLOSURE

A capacitor terminal bushing suitable for use with available, submersible type, high voltage cable fittings and connectors, the bushing comprising a tubular ceramic member containing an inner metal stud, an outer metal cap disposed about the member, the stud and cap being secured and sealed to the ceramic member. The ceramic member is further provided with a shank portion for receiving the submersible type connectors in a water tight manner. The outer metal cap is adapted to be secured and sealed about an opening in the capacitor casing, the opening accommodating a lead connecting the metal stud to capacitor components within the casing.

BACKGROUND OF INVENTION

The present invention relates generally to electrical capacitors, and particularly to a capacitor unit made suitable for underground use by virtue of a novel connector or terminal bushing which allows capacitor circuit connection via already existing and presently used submersible type high voltage connectors.

In the development of underground capacitor equipment it became highly desirable to have capacitor units suitable for use with already existing and highly reliable submersible type high voltage connectors. Such connectors are made of waterproof elastomeric materials formed to fit over a mating bushing or fitting in a water tight manner. For this reason, the electrical connections made by such connectors remain unaffected if and when they are completely submersed, for example, as might occur when an underground installation is flooded by flood waters.

Capacitor unit bushings presently in use are made of ceramic or glass bodies having integrally formed external circumferential projections for increasing the creep distance along the outside surface thereof. Internally, the bushing is provided with a metal stud protruding from one end thereof for making external circuit connections. The connections are made by clamping a connecting lead to the protruding portion of the stud, for example, by using a threaded stud and an accompanying nut. Such bushings are, of course, not suitable for use with the submersible connectors designed to engage mating bushings in the water tight manner described above.

Fittings are available for use with the submersible connectors, however, such fittings are not suitable for use with capacitor units. This is because the materials from which such fittings are made are chemically and thermally incompatible with the liquids and processes employed to impregnate the dielectric layers of the capacitor unit.

Specifically, the submersible type fittings and connectors employ an elastomer or synthetic rubber, for example, an ethylene-propylene terpolymer rubber, which when contacted by chlorinated diphenyl, use to impregnate capacitor dielectrics, leeches out contaminating components into the capacitor units which increase electrical energy losses in the capacitor units. Further the deterioration of the fitting materials changes the dimension of the fitting so that the quality of the connecting function is directly adversely affected thereby.

In a similar manner, the elastomer of the submersible type fitting cannot withstand the high temperatures employed in vacuum processing capacitor units, such processes being well known in the capacitor making art.

Thus, what is needed in the underground capacitor art is connecting bushing which is electrically and mechanically suitable for use with high voltage submersible cable connectors available and in use, and a bushing made of materials that are compatible with presently used and known methods of vacuum processing and impregnating capacitor units.

BRIEF SUMMARY OF THE INVENTION

The present invention comprises a capacitor terminal bushing formed to receive available, submersible type connectors for external circuit connection, the bushing comprising a ceramic tubular insulating member having a shank portion formed to receive the connector in a water tight manner, a metal stud supported in the tubular member to receive a terminal pin in the connector, and a metal cap disposed externally of the tubular member. The stud and cap are secured and sealed to the tubular member, and the cap is formed to be easily sealed to a capacitor casing. The ceramic and metal materials forming the bushing are not adversely affected by the capacitor impregnating liquids and heat treating processes, nor does the ceramic, being chemically inert, adversely affect the capacitor liquids.

THE DRAWING

The invention, with its objectives and advantages, will become more apparent from the following detailed description when read in connection with the accompanying drawing in which the sole figure shows a vertical section of a connector bushing constructed in accordance with the principles of the invention.

PREFERRED EMBODIMENT

Specifically, the figure shows a vertical section of a connector or terminal bushing 10 for a capacitor unit (not shown) the bushing 10 comprising an insulating tubular member 12 having an internal bore 14 supporting a metal tubular stud 16, and an outer metal cap structure 18 disposed around the lower end of the insulating member. The insulating member is made from a heat resistant, inert ceramic material, for example, porcelain.

The insulating member 12 is further provided with a shank portion 20 located above the metal cap 18, the shank being formed and dimensioned to receive thereover a mating elbow connector 21 (shown only in outline in the drawing) of the submersible type briefly described earlier. More particularly, such connectors have a center terminal pin 22 molded as an integral part of an insulating mass of elastomer material 21A formed about a center conductor 23 and an opening 24 adapted to receive an apparatus fitting or bushing, for example, the shank portion 20 of the insulating member 12. A jacket 21B of conductive or semi-conductive synthetic rubber is positively bonded to the insulating material to provide a shielded connector.

The metal stud 16 is secured within the bore 14 of the insulating member 12 by a metal washer clamp 25 disposed about the end of the stud extending into an enlarged open area or cavity 26 provided in the insulating member. The inner edge of the washer engages the stud in a clamping manner while the outer edge of the clamping washer is bent to extend into an accommodating annular depression 27 provided in the portion of the insulating member forming the end wall of the cavity 26.

A hermetic seal is formed between the metal stud 16 and the insulating member 12 by solder, for example, disposed about the stud and the stud engaging edge of the clamping washer 25 as indicated by numeral 28, and by an annular deposit of solder 29 in the annular depression 27 and about the outer bent edge of the clamping washer.

In a similar manner, the metal cap 18 may be secured and sealed to the outside surface of the insulating member 12, below the shank portion 20 thereof, by an annular mass of solder 30 disposed between said outside surface and the inner surface of the cap. To effect adherence of the solder to the ceramic material of the insulating member, the corresponding outer surface thereof may be tinned or coated with a ceramic adhering metallic substance or metallic glaze.

The upper end of the stud 16 is located slightly below the top level of the insulating member, and is provided with at least one axially extending slot 31 which allows the stud to expand radially when it receives the pin 22 provided in the connector 21.

To insure proper centering of the stud 16 and good electrical contact between the stud and the pin 22 when the connector 21 and bushing 10 are placed together, a resilient means, such as a tubular jacket 32 made from a spring metal, may be disposed between the stud and the wall of the insulating member 12 forming the internal bore 14. The jacket is provided with a slot (not shown) extending the length of the jacket which allows the jacket to expand and contract with the expansion and contraction of the slotted portion of the stud 16.

In the figure, the separation of the components located in the bore 14 is exaggerated for purposes of clarity of illustration; in practice, the jacket is disposed in close proximity to the stud and the wall of the bore 14 to insure the centering and spring contacting functions of the jacket.

With a high voltage on the stud 16, a potential difference between it and the wall of the bore 14 could cause ionization of the atmosphere around the stud. Such ionization would eventually burn and score the stud and bore wall as well as produce undesirable radio signal noise. To prevent such ionization, the bore 14 may be tinned with a metallic coating, as indicated by dash line 34, the coating extending to the location of the clamping washer 25 and the solder seal 28. In this manner, the coating 34 is electrically connected to the stud 16 so that both have the same potential when the bushing 10 (of a capacitor unit) is connected in service. The resilient jacket 32 further insures electrical contact and connection between the metallic coating 34 and the stud 16.

The bushing 10, as thus far described, is secured and sealed to a capacitor casing or can 40 (shown only in outline) over an opening 41 provided in said casing, said opening accommodating a lead 42 connecting the stud 16 to the capacitor elements (not shown) contained within the casing. The opening may be sized to accommodate the lower portion of the insulating member 12 as shown in the figure.

As shown in the figure, the top wall of the casing 40 is provided with a groove 43 formed around the opening 41 and dimensioned to accommodate and seat the bottom edge of the metal cap 18. The cap 18 is sealed to the casing by depositing a ring of solder 44 in the groove and about the edge of the cap seated therein. In this manner, the bushing 10 seals the casing about the opening 41.

In the figure, the conductive jacket or shield 21B of the connector 21 extends slightly below the insulating elastomer material 21A to form a vertical extension 50 of the jacket. Similarly, the upper portion of the metal cap 18 is provided with a shoulder 51 having an outside diameter and vertical side dimensioned to accommodate the extension 50. When the connector 21 is fully disposed on the bushing 10, a continuous electrical shield to the capacitor casing 40 and the casing potential is provided by virtue of the lower extension 50 of the conductive jacket 21B engaging the vertical side of the shoulder 51 of the metal cap 18.

As explained earlier, the shank portion 20 of the insulating member 12 is formed and dimensioned to receive the submersible type connector 21 in a water tight manner thereby permitting the use of such connectors with capacitor units. The ceramic material of the member 12 will not contaminate the dielectric liquid and components in the casing 40 as would be the case with the use of bushings made of the elastomer materials employed in presently available submersible type bushings for use with submersible type connectors. In a similar manner, the metal parts employed in the bushing 10 can withstand the temperatures used in processing capacitor units, the metal of the parts being similarly unaffected by the capacitor dielectric liquids.

Thus, by using bushing component materials that are compatible with the dielectric liquid and heat treating processes employed in capacitor manufacturing, the present disclosure has provided a novel capacitor bushing suitable for use with available high voltage connectors, such connectors being particularly useful in underground installations.

Though the invention is described with a certain degree of particularity, changes may be made therein without departing from the spirit and scope thereof.

What is claimed is:

1. A terminal bushing for a capacitor unit, said bushing comprising a tubular insulating member having a central bore extending therethrough and having a shank portion, a metal terminal stud disposed in said bore, securing means joined to said stud with a sealing connection adjacent the lower end of the bore, said securing means being secured and sealed to the insulating member to secure the stud in position, a tubular resilient centering member disposed around the stud in the upper part of the bore to position the stud therein, and a metal cap extending around the insulating member below the shank portion and secured to the insulating member with a sealing connection.

2. A terminal bushing as defined in claim 1 in which the terminal stud terminates within the bore near the upper end of the shank portion, at least the upper end of the stud being tubular to receive an external connector.

3. A terminal bushing as defined in claim 1 in which the wall of the bore has a conducting coating extending over the entire length of the bore, said coating being in electrical contact with said securing means and the stud.

4. A terminal bushing for a capacitor unit adapted for cooperation with an external connector, said terminal bushing comprising a tubular insulating member having a central bore extending therethrough and having a shank portion, a metal terminal stud disposed in said bore and secured to the insulating member at the lower end of the bore with a sealing connection, said stud terminating within the bore near the upper end of the shank portion, at least the upper end of the stud being tubular to receive said external connector, and a metal cap extending around the insulating member below the shank portion and secured to the insulating member with a sealing connection, said metal cap having a shoulder portion at its upper end in position to engage a conductive shielding jacket on said external connector.

5. A terminal bushing as defined in claim 4 in which a tubular resilient centering member is disposed around said terminal stud in the upper part of the bore to position the stud therein.

6. A terminal bushing as defined in claim 4 in which the wall of the bore has a conducting coating extending over the entire length of the bore, said coating being in electrical contact with the stud at the lower end of the bore.

References Cited

UNITED STATES PATENTS

| | | |
|---|---|---|
| 2,282,106 | 5/1942 | Underwood. |
| 2,346,831 | 4/1944 | Drury _____ 339—259 X |
| 2,498,589 | 2/1950 | Steinke _____ 339—136 X |
| 3,063,144 | 11/1962 | Palmour. |
| 3,231,666 | 1/1966 | Frink _____ 174—152 X |
| 3,376,541 | 4/1968 | Link _____ 339—143 X |

LARAMIE E. ASKIN, Primary Examiner

U.S. Cl. X.R.

174—152; 339—129, 136, 259